Oct. 18, 1938.      E. T. CONDON      2,133,427
LUGGAGE RACK FOR AUTOMOBILES
Filed Feb. 16, 1935      3 Sheets-Sheet 1

INVENTOR.
EDWARD T. CONDON
BY
ATTORNEY.

Oct. 18, 1938.  E. T. CONDON  2,133,427
LUGGAGE RACK FOR AUTOMOBILES
Filed Feb. 16, 1935  3 Sheets-Sheet 2
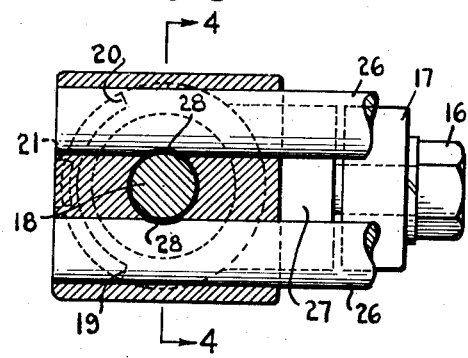
FIG. 3
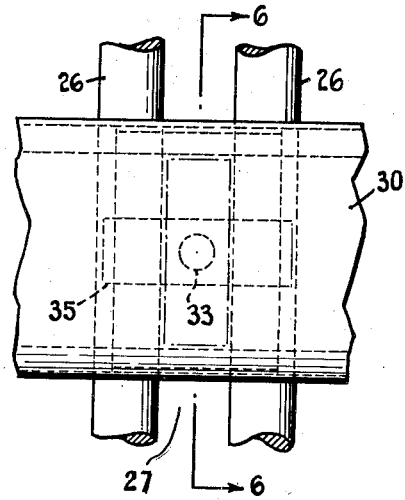
FIG. 5
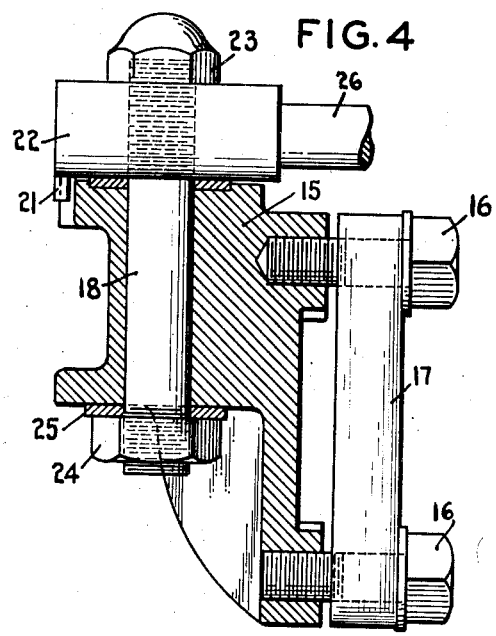
FIG. 4
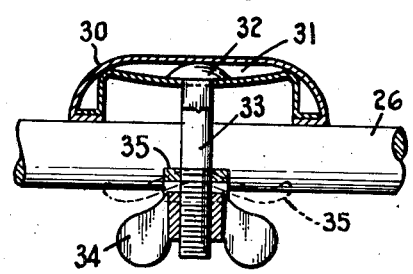
FIG. 6
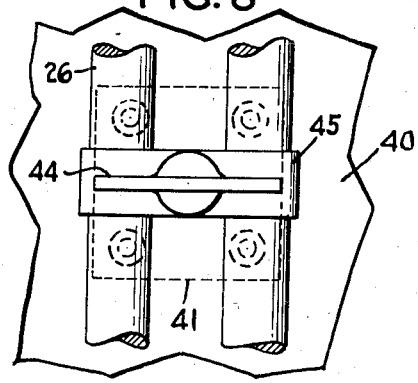
FIG. 8
FIG. 7
INVENTOR.
EDWARD T. CONDON
BY
ATTORNEY.

Oct. 18, 1938.  E. T. CONDON  2,133,427

LUGGAGE RACK FOR AUTOMOBILES

Filed Feb. 16, 1935  3 Sheets-Sheet 3

INVENTOR.
EDWARD T. CONDON
BY
ATTORNEY.

Patented Oct. 18, 1938

2,133,427

UNITED STATES PATENT OFFICE 2,133,427

LUGGAGE RACK FOR AUTOMOBILES

Edward T. Condon, New York, N. Y.

Application February 16, 1935, Serial No. 6,828

2 Claims. (Cl. 224—29)

The invention relates to an accessory for an automobile, more especially in the nature of a carrier for luggage and the like.

It has for an object the provision of a luggage carrier which may readily be installed, as by clamping the same to a rear bumper, or bumperettes, of an automobile, and having supporting arms which, when not in use, may be moved to an inoperative and inconspicuous position.

A further object of the invention resides in the provision of slots or like members for use with the supporting arms and which may be removably located along the said arms when extended.

A still further object of the invention resides in the provision of holding straps which may be adjusted longitudinally of the said supporting arm to assist in retaining luggage on the platform afforded by the slats.

The invention has for another object the provision of conveniently manipulated rack means of the aforesaid nature which shall be simple, rugged and inexpensive in construction, and which withal may be made up into a compact package as for shipment or storage purposes; also, rack means which are conveniently demountable.

In carrying out the invention, a pair of mounting brackets is provided with clamping means for attaching a pair of supporting arms, pivoted respectively thereon, to the opposite ends of the rear bumper of an automobile, preferably to the support member thereof. A said mounting bracket carries for limited oscillation therein a clevis or arm member comprising a rod bent into the form of a U with its free ends secured in a block or head oscillatable in said bracket.

Limiting stops of a bracket are so positioned that an arm may be swung outwardly, when the bracket is mounted as aforesaid, to project rearwardly from the rear bumper substantially parallel to the longitudinal axis of the automobile; and when the same is not desired for use, the arm may be swung at right angles to an inoperative position until again required. These swingable members afford supports for the luggage and, in their construction from a rod bent upon itself, provide a slot adapted to receive clamping means located at opposite ends of slats which may thus be supported by the said arms and adjusted in position thereon at various locations along the length of a rod. Furthermore, these slots may accommodate clips or hooks of a pair of straps designed to be brought over the luggage and secured together in the usual manner by bringing the free end of one of the straps through a suitable buckle or keeper of the other.

The nature of the invention, however, will best be understood when described in connection with the accompanying drawings, in which:

Fig. 3 is a horizontal section through a mounting bracket for a rack arm, the inner end of which is indicated in plan.

Fig. 4 is a vertical section thereof taken on the line 4—4, Fig. 3, and looking in the direction of the arrows.

Fig. 5 is a fragmentary plan view illustrating the application of a slat to a rack arm.

Fig. 6 is a vertical section therethrough taken on the line 6—6, Fig. 5, and looking in the direction of the arrows.

Figs. 7 and 8 are fragmentary views illustrating the manner of supporting a trunk or the like directly upon the carrier arms—Fig. 7 being a longitudinal section therethrough, and Fig. 8 an underneath plan view.

Figure 1:
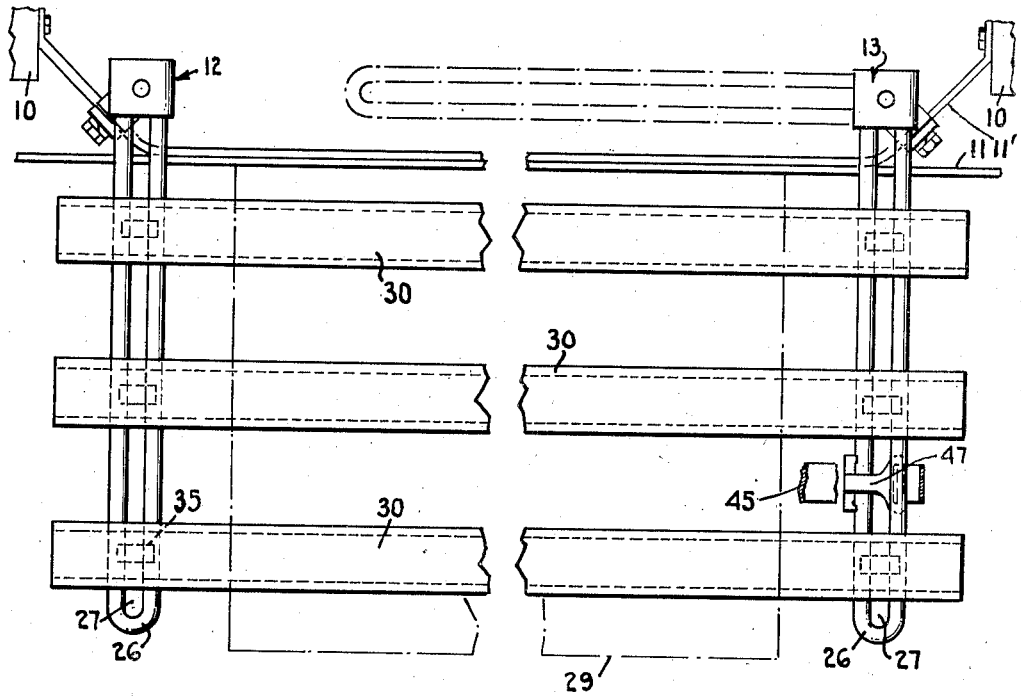
Fig. 1 is a plan view illustrating the novel rack installed on the rear bumper of an automobile.
Figure 2:
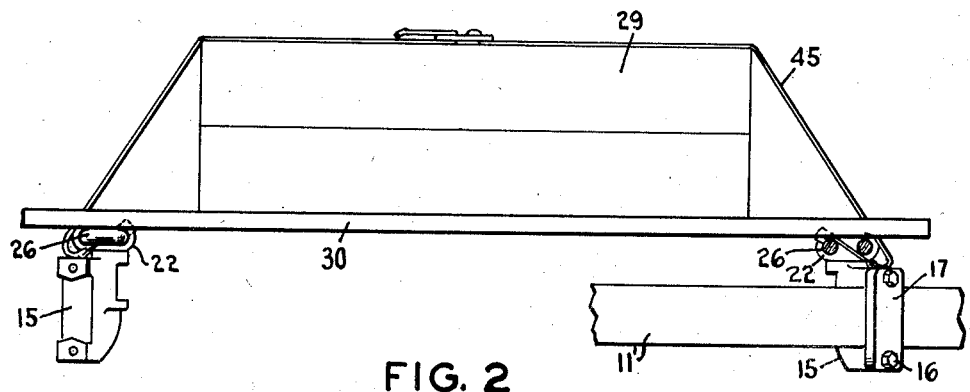
Fig. 2 is an end view thereof, with the bumper partly broken away, and luggage strapped on the rack.
Figure 9:
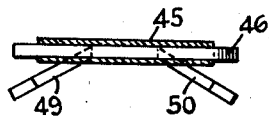
Figs. 9 and 10 are respectively a vertical section and a plan view of a novel strap, hook or clip member for use with the rack arms in retaining luggage, as on slats mounted thereon.
Figure 10:
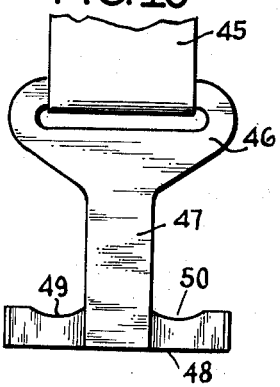

Referring to the drawings, more particularly Figs. 1 and 2, 10 designates the rear frame of an automobile carrying in the usual manner the rear bumper 11 with support member 11' therefor and to which the novel rack device is preferably to be secured. This may be effected conveniently through a pair of mounting brackets 12 and 13, shown more particularly in Figs. 3 and 4. A mounting bracket, as indicated, comprises the body portion 15 designed to receive clamping screws 16 passing through a clamping bar 17 whereby the body portion 15 may be rigidly attached to the bumper portion 11'. In the body portion is designed to oscillate a vertically disposed spindle 18 whose angular motion is limited by stops 19 and 20 of the body portion and designed to be engaged by a finger 21 projecting downwardly from a block 22 and held to the body portion 15 through head 23 of the spindle. The opposite and projecting end of said spindle is threaded to receive a locking nut 24 and lock washer 25. By this expedient, the block 22 may be frictionally held in any desired position between the limiting stops 19 and 20.

The said head 22, furthermore, is designed to receive and to anchor therein the free ends of a clevis member or U-shaped element comprising a rod bent back upon itself to afford a projecting arm member 26. The construction is such, moreover, that the two side elements of the arm are separated to provide a slot 27 therebetween; and the free ends of each arm may be grooved along the respective inner walls thereof at right angles to the axis of the arm to afford recesses 28 therein adapted to receive the spindle 18 and thus firmly anchor an arm to the block 22 to prevent its withdrawal in the direction of its length.

By swinging the arms outwardly through corresponding oscillation of spindle 18, they may be brought to extend rearwardly from the bumper and substantially parallel to the longitudinal axis of the automobile and thus afford support for luggage 29, Fig. 2 of the drawings. When not in use, an arm may be positioned substantially at right angles to the foregoing position, as indicated by the dotted line position shown in Fig. 1.

It is preferred, however, to provide a plurality of slat members, as the slats 30 indicated in Figs. 1 and 2 of the drawings, these being interposed between the luggage 29 and the pair of arms 26 to afford a platform. Provision is made for clamping a slat in any desired location along the arm, for example by means of clamping elements adjustable along the slot 27 of an arm. To this end, a slat may be constructed of two metal halves, Fig. 6, affording a chamber 31 therebetween adapted to accommodate the head 32 of a bolt 33. At its outer threaded end, the bolt is adapted to receive a wing nut 34 for adjusting a clamping plate 35 into position to clasp the respective undersides of the two elements of an arm 26. The dotted position of this clamping plate, indicated in Fig. 6, shows the position for release of a slat, it being understood that upon loosening of the wing nut on the bolt, a slat may be removed from the rack by lifting up on the same.

While the use of a plurality of slats in this manner may provide a platform for conveniently supporting luggage, it is to be understood that these slats are not essential, particularly where the use of a container such as a trunk or the like is contemplated. Thus, as indicated in Figs. 7 and 8, a trunk 40 may have secured at various points along the bottom thereof plates 41 threaded at 42 to receive the threaded end of a bolt 43, there being provided over said bolt and between its head 44 a clamping plate 45 designed to engage the side elements of an arm 26. By taking up on the bolt, the trunk 40 may thus be securely held to the arms at various positions along the length of the latter.

The slots 27 provided by an arm are adapted also to receive clips or hooks of pairs of straps which may be brought over the luggage, as indicated in Figs. 1 and 2 of the drawings, to insure its retention thereon, as, for example, upon the platform provided by the slats 30. Thus, reference being had to Figs. 9 to 15, a strap 45 is swivelled at its one end to the body portion 46 of a clip member, slotted to receive the strap end, and having extending therefrom the shank portion 47 with transverse bar or head 48. The latter has its fingers bent slightly upwardly, while along its inner edge and immediately adjacent the shank 47 the respective fingers are notched as at 49 and 50.

These notches are adapted to fit over the respective side elements of an arm 26 to clutch the same when the strap is under tension, shank 47 being designed to pass through the slot 27 provided between the side elements of the rack arm.

Figure 11:
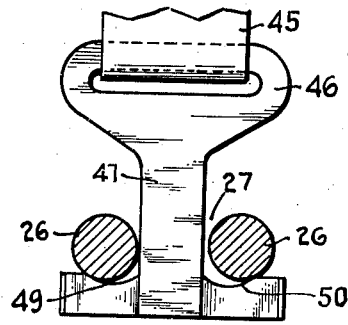
Fig. 11 is a fragmentary vertical section through a rack arm and illustrates the novel clip associated therewith.
Figure 12:
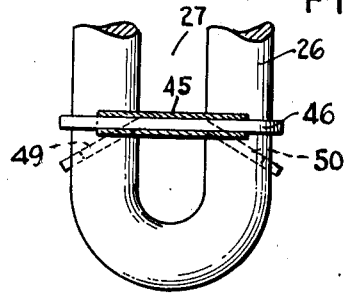
Fig. 12 is a horizontal section through the clip in position.

The clip fingers may be caused to engage both of the side elements of an arm 26 as indicated in Figs. 11 and 12; in which case, however, an object retained thereby on the rack arms would have a tendency to slide along same, but this is limited through contact of a clip with the bend at the outer end of the rack arm or with its supporting block at the inner end thereof.

Figure 13:
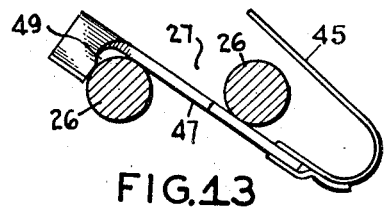
Figs. 13 and 14 are fragmentary vertical sections through a rack arm and illustrate different ways of holding a clip thereto.
Figure 14:
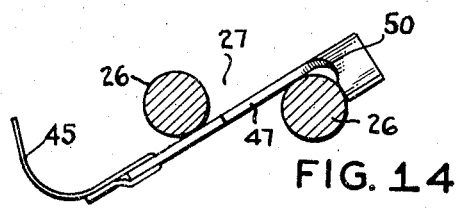

The fingers of a clip, bent upwardly as set forth, may be held also against only one of the sides of a rack arm with its shank bearing against the other, as indicated in Figs. 13 and 14. In the former embodiment, the strap 45 will extend upwardly over the outer of the side elements; while in the latter embodiment, the strap 45 extends from the inner of the side elements of a rack arm as indicated, when tension is applied thereto.

Figure 15:
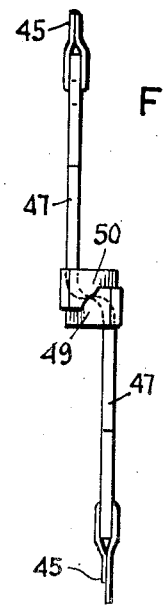
Fig. 15 is a fragmentary end view illustrating the manner of interlocking the clips of a pair of belts.

The particular construction of clip element with bent fingers allows also of conveniently locking the clip ends of a pair of straps together through interlocking of their respective notches, as indicated in Fig. 15 of the drawings; and this arrangement may be found useful where two straps of given length, applied as indicated in Figs. 11 to 14, do not afford sufficient length to span the luggage carrier on the rack.

I claim:

1. Luggage rack for attachment to an automobile bumper, comprising a pair of brackets, and a pair of U-shaped arms located in substantially the same horizontal plane parallel to the bumper, swingably supported thereon and affording respective longitudinal slots uninterrupted substantially from a bracket to the end of an arm for receiving holding means longitudinally slidable therein to accommodate varying widths of luggage and locate the same in proximity to the brackets.

2. Luggage rack for attachment to an automobile bumper, comprising a pair of brackets, and a pair of U-shaped arms located in substantially the same horizontal plane parallel to the bumper and embodying rods bent back upon themselves to afford a slot therebetween uninterrupted substantially from a bracket to an end of an arm for receiving holding means longitudinally slidable therein to accommodate varying widths of luggage and locate the same in proximity to the brackets, and the said arms being swingably supported at their inner ends by the corresponding brackets for location in service position substantially parallel to the longitudinal axis of the automobile and also at an angle thereto.

EDWARD T. CONDON.